Feb. 7, 1967 J. G. HUMPHREY 3,303,282
BLANKING CIRCUIT ARRANGEMENT FOR A TELEVISON SYSTEM
UTILIZING PULSES DERIVED FROM THE HIGH
VOLTAGE POWER SUPPLY CIRCUIT
Filed Nov. 1, 1963
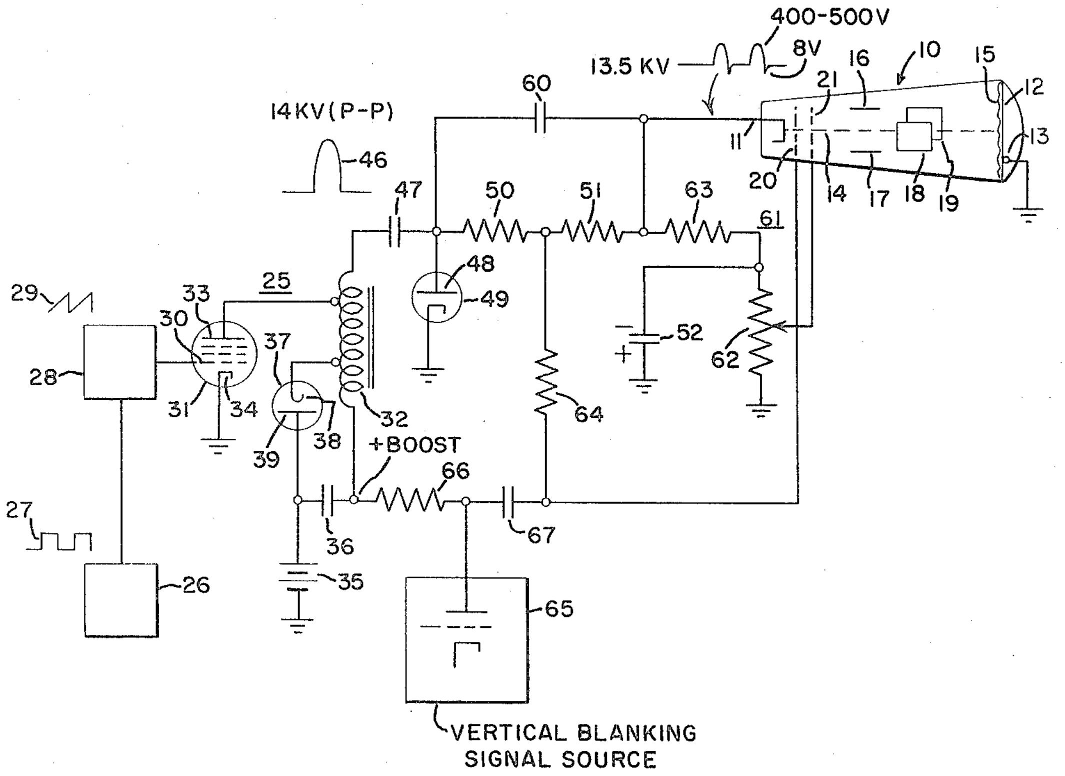
INVENTOR:
JOHN G. HUMPHREY.
BY Donald N. Timbie
HIS ATTORNEY.

United States Patent Office 3,303,282
Patented Feb. 7, 1967

3,303,282

BLANKING CIRCUIT ARRANGEMENT FOR A TELEVISION SYSTEM UTILIZING PULSES DERIVED FROM THE HIGH VOLTAGE POWER SUPPLY CIRCUIT

John G. Humphrey, Syracuse, N.Y., assignor to General Electric Company, a corporation of New York Filed Nov. 1, 1963, Ser. No. 320,761
1 Claim. (Cl. 178—7.5)

This invention relates to television systems and more particularly to a circuit arrangement for providing horizontal blanking pulses in a television system.

In one type of light-valve television system, an electron beam is periodically deflected in a scanning raster on a surface of a deformable medium. A system of this type is described in Patent No. 2,957,942 which is assigned to the assignee of the present invention. In this system, as in some other television systems, it is desirable to blank the electron beam during horizontal and vertical retrace portions of the scanning raster.

Accordingly, it is an object of this invention to provide a circuit arrangement for blanking an electron beam in a television system.

Another object is to provide a circuit arrangement for blanking an electron beam in a light-valve television system.

In one form of the referred-to light-valve television system, a beam generating electron gun having input electrodes is mounted in a sealed envelope. A pulse type power supply is provided for establishing a relatively high direct-current electron beam accelerating potential between the input electrodes of the gun and an oppositely disposed target. Horizontal blanking pulses are developed in a separate blanking circuit. The horizontal blanking circuit comprises a multivibrator which is triggered by a signal occurring at a television line frequency which may be, for example, 15.75 kc. The output of the multivibrator, which may be positive-going square wave pulses, is amplified, inverted and differentiated to provide negative going blanking pulses having a slight overshoot as the more positive portion of a trailing edge. The overshoot serves to overcome an inertia in the deformable medium, as is described in copending application Serial No. 94,860 filed March 10, 1961, and which is assigned to the assignee of the present invention. The amplified pulses are combined with the vertical blanking pulses at an input electrode of the electron gun to blank the beam during the retrace portions of the raster.

In the present invention, the need for a separate horizontal blanking circuit is obviated and the horizontal blanking pulses are developed by utilizing a portion of the high voltage pulses existing in the high voltage power supply. Such an arrangement simplifies considerably the necessary electrical circuits and provides a considerable cost improvement due to decreased cost of manufacture and elimination of costly components.

Another object of this invention is to provide an improved horizontal blanking circuit which is simple and economical in construction.

Another object of this invention is to provide an improved horizontal blanking circuit for generating horizontal blanking pulses having pulse smoothing segment thereof in a projection television system.

Yet another object of this invention is to provide an improved horizontal blanking circuit which obviates the need for separate multivibrator blanking circuit.

In carrying out this invention, in one form thereof, horizontal blanking pulses are developed by utilizing a portion of high voltage pulses existing in a pulse type high voltage power supply circuit. To this end, high voltage pulses, at a rate corresponding to the horizontal line frequency of a projection television system, are provided in a conventional manner. A portion of each of the high voltage pulses is coupled through an impedance network to the cathode of the projection tube to provide thereto the horizontal blanking pulses at the horizontal line frequency rate.

While the specification concludes with a claim particularly pointing out and distinctly claiming the subject matter of the invention it is believed that the invention will be better comprehended from the following description taken in connection with the accompanying drawing, the single figure of which is a schematic diagram of the horizontal blanking circuit embodying this invention.

Referring to the figure, there is shown a projection tube or electron gun 10 having a cathode electrode 11 and a target electrode 12 suitably grounded as at 13. An electron stream or beam, indicated by the dotted line 14 from the cathode 11 to the target electrode 12, serves to provide a scanning raster on the deformable liquid or medium 15. A pair of horizontal deflection plates 16 and 17 and a pair of vertical deflection plates 18 and 19 are provided and suitably energized, in a manner well known in the art, for deflecting the electron beam 14 to provide the desired scanning raster upon the deformable medium 15. Control electrode 20 and focusing electrode 21 are connected to a voltage divider network which provides the proper D.C. biasing voltage for the electrodes to control the electron beam. The D.C. biasing voltage for the control electrode 20, focusing electrode 21 and the operating voltage for the projection tube 10 are obtained from the high voltage supply circuit indicated generally at 25.

For a more detailed description of the construction and operation of the projection tube 10 in a projection television system, reference is made to the projection television system of the aforementioned Patent No. 2,957,942.

The high voltage supply circuit 25, which may be of the flyback type, is well known in the art and develops the D.C. operating and bias voltages, and is controlled through a suitable timing source 26, which may be, for example, a square wave multivibrator. The output of source 26 provides the timing pulses 27 having a repetition rate at the television line frequency, which may be in the order of 15.75 kc. The timing pulses 27 are translated through a low level amplifier or sawtooth generator 28 whose output, indicated as control pulses 29 having a sawtooth wave shape, is applied to the control electrode 30 of driver tube 31. Control pulses 29 serve to control the firing of driver tube 31 at the desired synchronized line frequency rate.

Electron discharge device 31, which may be the conventional output amplifier tube or horizontal driver of a projection television system, supplies electrical energy to inductor element 32, which may be an autotransformer or a two-winding transformer. The electrical energy from driver tube 31 is stored in the magnetic field of inductor 32 during the trace portion of the horizontal deflection signal for the projection system and energy is transferred from the inductor 32 to the high voltage rectifying circuit during the retrace portion of the horizontal deflection signal.

The driver tube 31 comprises a pair of output electrodes, such as anode 33 and cathode 34 coupled in series with inductor 32, a B+ source of anode potential or voltage supply 35 and a B+ boost capacitor 36. Damper diode 37 has its cathode 38 coupled to a tap or terminal on inductor 32 and its anode 39 connected to the voltage supply 35 in a conventional manner to minimize waveform distortion.

The energy transferred to the high voltage rectifying circuit due to the collapse of the magnetic field of inductor element 32 takes the form of positive-going high voltage pulses, indicated at 46, which may be in the order of magnitude of 14 kv. peak to peak. These positive-going pulses are translated through capacitor 47 to anode 48 of rectifier 49. The positive pulses, which occur during the retrace period, are rectified by rectifier 49 and filtered through a filtering network comprising serially-connected resistors 50, 51, 63 and capacitor 52.

Upon conduction of rectifier 49, capacitor 52 is charged plus (+) to minus (−), as shown, to place the cathode 11 of projection tube 10 at a negative reference operating level of approximately 13.5 kv. relative to the grounded target electrode 12. This serves to establish the operating or electron beam accelerating potential for the projection tube 10 to permit conduction of the tube and provide the desired scanning raster upon the deformable medium 15.

For developing the horizontal blanking pulses, there is provided an impedance network connecting the cathode electrode 11 of the projection tube 10 to the source of unidirectional pulses. The impedance network comprises a reactive element 60, which may be a capacitor, connected in shunt or parallel with serially connected resistive impedance elements 50, 51 of the filter network. The junction of capacitor 60 and resistor 50 is connected to the source of unidirectional pulses at the anode 48 of rectifier 49, while the junction of capacitor 60 and resistor 51 is connected to the cathode electrode 11 of projection tube 10.

The cathode electrode 11 of projection tube 10 is maintained at the negative reference level of approximately 13.5 kv., and the horizontal pulses appearing across the impedance network are of the magnitude equal to the difference in magnitude between the voltage at opposite junctions of the impedance network which is, for example, approximately 14 kv.

Thus, a portion of each of the high voltage pulses appearing at the junction of capacitor 60 and resistor 50 is coupled through the impedance network to the cathode electrode 11 of the projection tube 10 as the horizontal blanking pulses. Since these horizontal blanking pulses occur at the horizontal line frequency rate, the need for a separate horizontal blanking pulse generator and its associated synchronizing and amplifying circuits is obviated.

In projection television systems such as described in the aforementioned Glenn Patent No. 2,957,942, it may be desirable to provide means for smoothing the deformable liquid which is continuously circulated to prevent decomposition of the liquid. To this end, capacitor 60 in combination with resistor 63 also serves to differentiate the trailing edge to the high voltage pulses to provide a small overshoot voltage at the trailing edge of the horizontal blanking pulses of a polarity opposite that of the horizontal blanking pulses.

The D.C. bias across the cathode 11 and control electrode 20 of the projection tube is developed by the combined currents of the projection tube 10 and the voltage divider 61 comprising resistors 62 and 63. These currents establish a voltage drop across resistor 51 that maintains the control electrode 20 negative with respect to cathode 11 during the normal trace period of the electron beam 43. Upon occurrence of the horizontal blanking pulses, the cathode 11 is driven more positive to reduce the electron beam accelerating potential and effect blanking. Although pulses occurring at a horizontal line frequency rate may exist at the junction of resistors 50 and 51, these pulses are greatly attenuated in their appearance at the control electrode 20 due to the voltage drop across attenuating resistor 64. The bias voltage for the projection tube focusing electrode 21 is established across the voltage divider 61 and is taken from the movable wiper arm of resistor 62 which permits adjustment of the D.C. bias or focusing potential.

A conventional vertical blanking signal source 65 is provided which furnishes the vertical blanking pulses during the vertical retrace time. The operating potential for source 65 is derived from the boost capacitor 36 through resistor 66. The output of source 65 is coupled through capacitor 67 to control grid 20 to blank the projection tube during the vertical retrace period.

In operation of the circuit, high voltage pulses are developed in inductor 32 and are of the order of magnitude of approximately 14 kv. peak to peak. These pulses occurring at the horizontal line frequency, which may, for example, be 15.75 kc. are coupled through capacitor 47 to the anode electrode 48 of rectifier 49. Rectifier 49 is poled for conduction upon the presence of a positive voltage or signal at its anode 48 causing capacitor 52 to charge plus (+) to minus (−) as shown. The filtering action of capacitor 52 and resistors 50, 51 and 63 serve to establish the operating potential at the cathode 11 of projection tube 10. The operating potential is of the order of magnitude of negative 13.5 kv. relative to the grounded target electrode 12.

A portion of each of the high voltage pulses developed in inductor 32 of the high voltage supply circuit 25 is coupled through the impedance network comprising capacitor 60 and resistors 50 and 51 to the cathode electrode 11 of the projection tube 10. Capacitor 60, in combination with resistor 63 of the filter network, also serves to differentiate the trailing edge of the portion of the high voltage pulses coupled to the cathode electrode. Since the high voltage pulses, at the horizontal line frequency rate, occur during the retrace portion of the horizontal deflection signal of the projection television system, the voltage coupled to the cathode electrode 11 comprises positive-going blanking pulses of the order of magnitude of 400 to 500 volts. These pulses serve to decrease the relative operating or accelerating potential for the electron beam applied to the cathode electrode 11 of the projection tube 10, and thus blank the projection tube 10 during the retrace period. The trailing edge of the blanking pulses, due to differentiation, provides a relatively low level negative overshoot voltage, which may be, for example, of the magnitude of approximately eight volts. This low level overshoot serves to drive the cathode more negative thereby increasing the relative operating or accelerating potential of the electron beam and serves to overcome the inertia effect of the deformable medium 15.

Although a particular embodiment of the subject invention has been described, many modifications may be made, and it is intended by the appended claim to cover all such modifications which fall within the true spirit and scope of the invention.

What I claim as new and desire to secure by Letters Patent of the United States is:

In a projection television system the combination comprising:

(a) a projection tube having at least a cathode electrode, a control electrode, a target electrode and a deformable medium adjacent said target electrode, (b) a source of high voltage unidirectional pulses of a predetermined magnitude occurring at a horizontal line frequency rate, (c) rectifier means connected to said source of unidirectional pulses for rectifying said pulses to provide a high D.C. operating potential across said cathode and target electrodes, said operating potential being of a magnitude less than the predetermined magnitude of said unidirectional pulses, and (d) an impedance network connecting said cathode electrode to said source of unidirectional pulses for coupling a portion of said unidirectional pulses to said cathode electrode to provide horizontal blanking pulses, said horizontal blanking pulses occurring at said horizontal line frequency rate for blanking said projection tube during the horizontal retrace period, said impedance network comprising a first and second resistive impedance element serially connected, a capacitor connected across said first and second resistive impedance elements, the junction of said first resistive impedance element and said capacitor being connected to said source of unidirectional pulses, the junction of said resistive impedance element and said capacitor being connected to said cathode electrode, and a third resistive impedance element connecting the junction of said first and second resistive impedance elements to said control electrode for attenuating the horizontal blanking pulses appearing at said junction of said first and second resistive impedance elements.

References Cited by the Examiner

UNITED STATES PATENTS

| | | | |
|---|---|---|---|
| 3,132,281 | 5/1964 | Szeremy | 315—22 |
| 3,155,871 | 11/1964 | Good | 315—22 |

DAVID G. REDINBAUGH, *Primary Examiner.*

J. McHUGH, R. L. RICHARDSON, *Assistant Examiners.*